(12) United States Patent
Zhang et al.

(10) Patent No.: US 11,303,191 B2
(45) Date of Patent: Apr. 12, 2022

(54) THREE-DEGREE-OF-FREEDOM BEARINGLESS SWITCH RELUCTANCE MOTOR EXCITED BY CONSTANT CURRENT SOURCE

(71) Applicant: HUAIYIN INSTITUTE OF TECHNOLOGY, Huaian (CN)

(72) Inventors: Tao Zhang, Huaian (CN); Wei Ni, Huaian (CN); Yue Zhang, Huaian (CN); Zhujun Ding, Huaian (CN); Yeqing Wang, Huaian (CN); Zhongyi Tang, Huaian (CN); Weihong Ding, Huaian (CN)

(73) Assignee: HUAIYIN INSTITUTE OF TECHNOLOGY, Huaian (CN)

( * ) Notice: Subject to any disclaimer, the term of this patent is extended or adjusted under 35 U.S.C. 154(b) by 0 days.

(21) Appl. No.: 17/256,888

(22) PCT Filed: Jun. 14, 2019

(86) PCT No.: PCT/CN2019/091312
§ 371 (c)(1),
(2) Date: Dec. 29, 2020

(87) PCT Pub. No.: WO2020/001289
PCT Pub. Date: Jan. 2, 2020

(65) Prior Publication Data
US 2021/0320575 A1 Oct. 14, 2021

(30) Foreign Application Priority Data
Jun. 30, 2018 (CN) .......................... 201810715528.5

(51) Int. Cl.
*H02K 19/10* (2006.01)

(52) U.S. Cl.
CPC ....... *H02K 19/103* (2013.01); *H02K 2201/18* (2013.01)

(58) Field of Classification Search
CPC ...... H02K 1/146; H02K 1/246; H02K 19/103; H02K 2201/18; H02K 3/20; H02K 7/09; H02K 7/08
See application file for complete search history.

(56) References Cited

U.S. PATENT DOCUMENTS 5,818,137 A * 10/1998 Nichols ................. F16C 32/047
310/90.5
6,278,216 B1 * 8/2001 Li .......................... H02K 7/116
310/424
(Continued)

FOREIGN PATENT DOCUMENTS

| CN | 103016525 A | 4/2013 |
| CN | 103715945 A | 4/2014 |
| CN | 108809031 A | 11/2018 |

OTHER PUBLICATIONS

Office Action issued in corresponding Chinese Application No. 201810715528.5, dated Sep. 2, 2019; 11 pgs.
(Continued)

*Primary Examiner* — Naishadh N Desai
(74) *Attorney, Agent, or Firm* — Hauptman Ham, LLP

(57) ABSTRACT

A three-degree-of-freedom bearingless switched reluctance motor excited by a constant current source includes a rotor and a stator. The rotor consisting of a rotating shaft and a rotor core, where a plurality of rotor teeth is uniformly distributed on an outer circumference of the rotor core. The stator includes a stator core, a magnetic isolation ring, an axial suspension winding, and a magnetic conduction ring that are sequentially connected, and axial control cores and annular constant current source windings which are symmetrically arranged on both sides of the stator core. Outer (Continued)

edges of the axial control cores are connected to the magnetic conduction ring, and inner edges extend to the rotor core. The stator core and the magnetic isolation ring both consist of an axial part and a radial part of which an outer end is connected to an inner wall of the axial part.

3 Claims, 2 Drawing Sheets

(56) References Cited

U.S. PATENT DOCUMENTS

| | | | |
|---|---|---|---|
| 7,663,281 B1* | 2/2010 | Nau | B61B 13/08 |
| | | | 310/90.5 |
| 2021/0288530 A1* | 9/2021 | Zhang | H02K 1/246 |
| 2021/0320575 A1* | 10/2021 | Zhang | H02K 19/103 |
| 2021/0376704 A1* | 12/2021 | Zhang | H02K 3/12 |

OTHER PUBLICATIONS

First Search Report issued in corresponding Chinese Application No. 201810715528.5, dated Aug. 23, 2019; 2 pgs (in English only).
International Search Report issued in corresponding International Application No. PCT/CN2019/091312; dated Sep. 3, 2019; State Intellectual Property Office of the P.R. China, Beijing, China, 5 pgs.
Written Opinion issued in corresponding International Application No. No. PCT/CN2019/091312; dated Sep. 3, 2019; State Intellectual Property Office of the P.R. China, Beijing, China, 8 pgs.

\* cited by examiner

THREE-DEGREE-OF-FREEDOM BEARINGLESS SWITCH RELUCTANCE MOTOR EXCITED BY CONSTANT CURRENT SOURCE

RELATED APPLICATIONS

The present application is a National Phase of International Application Number PCT/CN2019/091312 filed Jun. 14, 2019 and claims priority to Chinese Application Number 201810715528.5 filed Jun. 30, 2018.

TECHNICAL FIELD

The present invention relates to the technical field of manufacturing of bearingless and magnetic suspension motors, and in particular, to a three-degree-of-freedom bearingless switched reluctance motor excited by a constant current source.

BACKGROUND

Bearingless and magnetic suspension motors are novel special motors developed in the late 1980s. The bearingless motors are mainly divided into three types, i.e., reluctance-type, induction-type and bearingless switched reluctance motors. Compared with the other two types, the bearingless switched reluctance motor does not have a permanent magnet in a rotor, is simple in structure and high in rotor strength, does not have the influence of a complex induction magnetic field of the rotor of the induction-type bearingless motor on suspension and rotation, and is a bearingless motor having the widest industrial application prospect. The interior of the traditional bearingless switched reluctance motor only has two magnetic fields, i.e., a torque winding magnetic field and a suspension winding magnetic field, and the number of pole pairs $P_M$ of the torque winding magnetic field and the number of pole pairs $P_B$ of the suspension winding magnetic field must satisfy a relationship that $P_M=P_B\pm1$, so that a stable controllable radial suspension force can be generated. A torque is mainly generated by a reluctance force formed by the torque winding magnetic field via stator and rotor teeth, and a suspension force is generated by interaction between the suspension winding magnetic field and the torque winding magnetic field, thereby rendering that decoupling control between the suspension force and the torque of the traditional bearingless switched reluctance motor is extremely complicated, and an industrial application process of the traditional bearingless switched reluctance motor is limited.

In addition, if the bearingless motor desires to implement five-degree-of-freedom suspension operation, an axial magnetic suspension bearing is required to be used in cooperation with the bearingless motor. An axial magnetic bearing is bound to increase the axial length of a suspension motor system, thereby reducing a critical rotation speed and power density. Therefore, on the basis of implementing the decoupling control between the torque and the suspension force, the implementation of the integration of the bearingless switched reluctance motor and the axial magnetic bearing has become a research focus in the field of magnetic suspension motors.

SUMMARY

The object of the present invention is to provide a three-degree-of-freedom bearingless switched reluctance motor excited by a constant current source which is compact in structure and has no coupling among an axial suspension force, a radial suspension force, and a torque.

The present invention is achieved by means of the following technical solution:

A three-degree-of-freedom bearingless switched reluctance motor excited by a constant current source, including a rotor and a stator, the rotor consisting of a rotating shaft and a rotor core, where a plurality of rotor teeth is uniformly distributed on an outer circumference of the rotor core; the stator includes a stator core, a magnetic isolation ring, an axial suspension winding, and a magnetic conduction ring that are sequentially connected outwards in a radial direction of the rotor core, and axial control cores and annular constant current source windings which are symmetrically arranged on both sides of the stator core; outer edges of the axial control cores are connected to the magnetic conduction ring, and inner edges extend to the rotor core and are provided with axial working air gaps; the stator core and the magnetic isolation ring are both of a T-shaped structure consisting of an axial part and a radial part of which an outer end is connected to an inner wall of the axial part; an outer wall of the axial part of the stator core is attached to an inner wall of the axial part of the magnetic isolation ring, and the radial part of the magnetic isolation ring divides the axial part and the radial part of the stator core into two symmetric parts; four suspension teeth are uniformly provided on an inner circumference of the radial part of the stator core; a magnetic isolation body is connected to the inner circumference of the stator core between adjacent suspension teeth; a plurality of torque teeth is uniformly distributed on the magnetic isolation body; radial working air gaps are provided among the suspension teeth, the torque teeth, and the rotor core; and radial suspension windings and torque windings are respectively wound around the suspension teeth and the torque teeth.

A further solution of the present invention is that the torque winding uses a phase split structure.

A further solution of the present invention is that the tooth width of the suspension tooth is greater than that of the torque tooth and the tooth width of the suspension tooth is greater than one pole pitch of the motor.

Compared with the prior art, the advantages of the present invention are that:

I. The integration of a two-degree-of-freedom bearingless switched reluctance motor and an axial magnetic bearing is implemented. The present invention is a three-degree-of-freedom bearingless switched reluctance motor which is novel in structure and firstly invented in the world; axial and radial bias magnetic fluxes are respectively provided by two annular constant current source windings; the axial suspension winding is energized to generate an axial suspension magnetic flux, and the radial suspension winding is energized to generate a radial suspension magnetic flux; the radial and axial suspension magnetic fluxes respectively adjust the bias magnetic flux, so that a magnetic field on one side of the axial and radial air gaps is enhanced, and the magnetic field in an opposite direction is weakened, thereby generating a suspension force pointing to a magnetic field enhancement direction. An axial and radial displacement closed-loop control system is established according to the prior art to implement axial and radial three-degree-of-freedom stable suspension of the rotor. The torque teeth are integrated with the stator core by means of the magnetic isolation body; the torque winding magnetic field and the suspension magnetic field pass through different magnetic paths to form a closed path, and the number of pole pairs $P_M$ of the torque winding magnetic field and the number of pole pairs $P_B$ of the suspension winding magnetic field do not need to satisfy a relationship that $P_M=P_B\pm1$; the torque and the suspension force are not coupled; and the present invention is easy to control and implement.

II. The present invention is applied to a five-degree-of-freedom suspension driving system, may replace one axial magnetic bearing and the two-degree-of-freedom bearingless switched reluctance motor, greatly reduce the axial length and the volume and weight of the system, and has a milestone significance for implementing industrial application of the bearingless switched reluctance motor.

DETAILED DESCRIPTION

Figure 1:
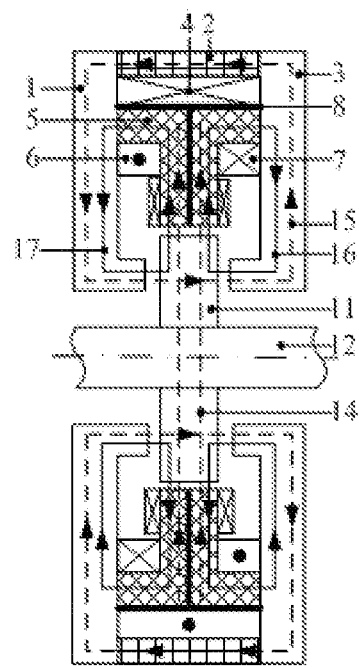
FIG. 1 is a section view of an axial structure and a magnetic flux of the present invention.
Figure 2:
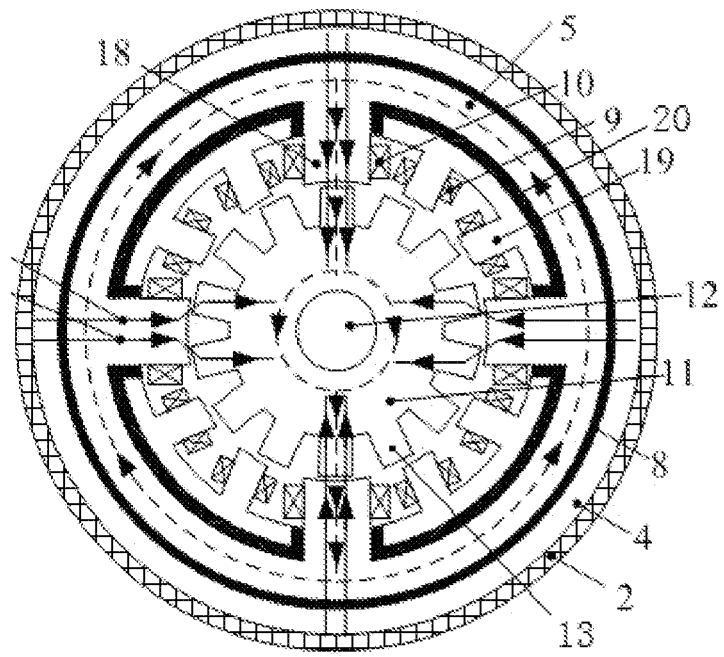
FIG. 2 is a schematic diagram of structures of a stator core and a rotor core, and a radial magnetic flux of the present invention.
Figure 3:
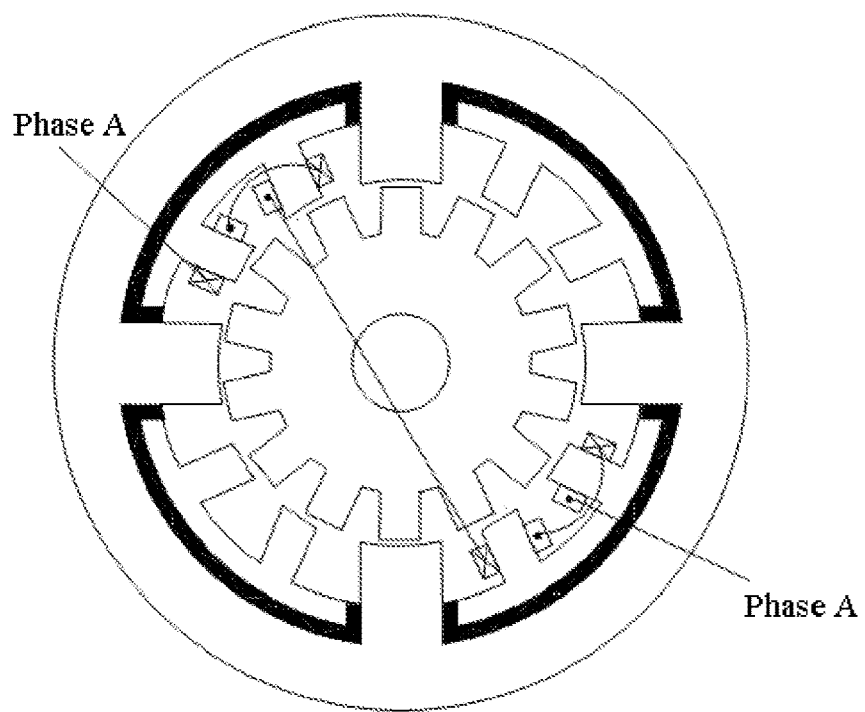
FIG. 3 is a schematic diagram of phase-A of a torque winding of the present invention.
Figure 4:
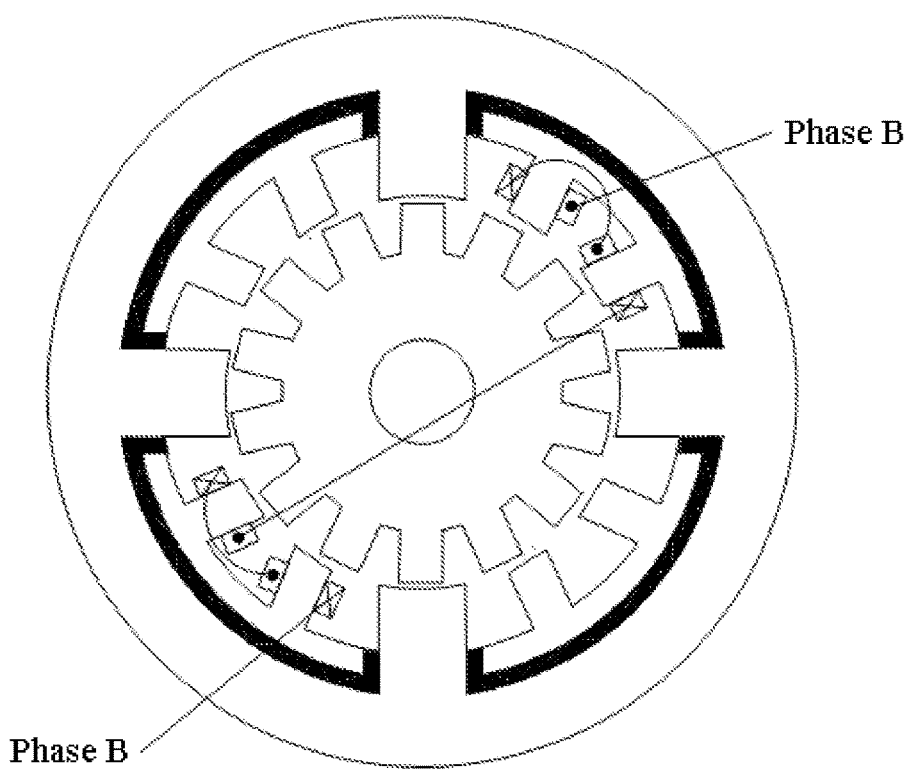
FIG. 4 is a schematic diagram of phase-B of a torque winding of the present invention.

A three-degree-of-freedom bearingless switched reluctance motor excited by a constant current source as shown in FIGS. 1-4 includes a rotor and a stator, where the rotor consists of a rotating shaft 12 and a rotor core 11, and a plurality of rotor teeth 13 is uniformly distributed on an outer circumference of the rotor core 11.

The stator includes a stator core 5, a magnetic isolation ring 8, an annular axial suspension winding 4, and a magnetic conduction ring 2 that are sequentially connected outwards in a radial direction of the rotor core 11, and a left axial control core 1 and a right axial control core 3 as well as a left annular constant current source winding 6 and a right annular constant current source winding 7 which are symmetrically arranged on both sides of the stator core 5. The left axial control core 1 and the right axial control core 3 may be of disc-shaped, three-pole, four-pole and other magnetic structures, and are of the disc-shaped magnetic structure in the present embodiment; the left annular constant current source winding 6 and the right annular constant current source winding 7 may be connected in series; outer edges of the left axial control core 1 and the right axial control core 3 are respectively connected to left and right side surfaces of the magnetic conduction ring 2, and inner edges respectively extend to the rotor core 11 and are provided with a left axial working air gap and a right axial working air gap; the stator core 5 and the magnetic isolation ring 8 are both of a T-shaped structure consisting of an axial part and a radial part of which an outer end is connected to an inner wall of the axial part; an outer wall of the axial part of the stator core 5 is attached to an inner wall of the axial part of the magnetic isolation ring 8, and the radial part of the magnetic isolation ring 8 divides the axial part and the radial part of the stator core 5 into two bilaterally symmetric 7-shaped parts; the thickness of the radial part of the magnetic isolation ring 8 is greater than a sum of the left and right axial working air gaps; the axial part of the stator core 5, the axial part of the magnetic isolation ring 8, and left and right sides of the axial suspension winding 4 are respectively attached to inner walls of the left axial control core 1 and the right axial control core 3; the magnetic isolation ring 8 is made of a whole aluminum profile; left and right sides and the outer wall of the left annular constant current source winding 6 are respectively attached to the left axial control core 1 and the stator core 5; and left and right sides and the outer wall of the right annular constant current source winding 7 are respectively attached to the right axial control core 3 and the stator core 5.

Four suspension teeth 18 are uniformly provided on an inner circumference of the radial part of the stator core 5 in an x direction and a y direction; a magnetic isolation body 20 is connected to the inner circumference of the stator core 5 between adjacent suspension teeth 18; a plurality of torque teeth 19 is uniformly mounted on the magnetic isolation body 20; the tooth width of the suspension tooth 18 is greater than that of the torque tooth 19 and the tooth width of the suspension tooth 18 is greater than one pole pitch of the motor; radial working air gaps are provided among the suspension teeth 18, the torque teeth 19, and the rotor core 11; and radial suspension windings 10 and torque windings 9 are respectively wound around the suspension teeth 18 and the torque teeth 19.

The rotor core 11, the rotor teeth 13, the left axial control core 1, the right axial control core 3, and the stator core 5 are all made of a material having good axial and radial magnetic conductivity, and the radial suspension winding 10 and the torque winding 9 are both a concentrated winding.

The left axial control core 1, the right axial control core 3, the left annular constant current source winding 6, the right annular constant current source winding 7, the stator core 5, the magnetic isolation ring 8, the annular axial suspension winding 4, the magnetic conduction ring 2, the radial suspension winding 10, and the torque winding 9 are axially stacked.

The number of the rotor teeth 13 and the torque teeth 19 is adjustable.

A suspension principle is that: the left annular constant current source winding 6 and the right annular constant current source winding 7 respectively generate a left bias magnetic flux 17 and a right bias magnetic flux 16; the left bias magnetic flux 17 sequentially passes through the left axial control core 1, the left axial working air gap, the rotor core 11, the radial working air gap, the suspension teeth 18, and the stator core 5; and the right bias magnetic flux 16 sequentially passes through the right axial control core 3, the right axial working air gap, the rotor core 11, the radial working air gap, the suspension teeth 18, and the stator core 5, thereby forming two symmetric closed paths.

The axial suspension winding 4 is energized to generate an axial suspension magnetic flux 15, and the axial suspension magnetic flux 15 sequentially passes through the magnetic conduction ring 2, the left axial control core 1, the left axial working air gap, the rotor core 11, the right axial working air gap, and the right axial control core 3 to form a closed path;

the radial suspension winding 10 is energized to generate a radial suspension magnetic flux 14, and the radial suspension magnetic flux 14 passes through the stator core 5 above, the radial working air gap above, the rotor teeth 13 above, the rotor core 11, the rotor teeth 13 below, and radial working air gap below, and the stator core 5 below, and then forms a closed path with a yoke part of the stator core. The radial and axial suspension magnetic fluxes adjust corresponding bias magnetic fluxes, so that a magnetic field on one side of the axial and radial air gaps is enhanced, and the magnetic field in an opposite direction is weakened, thereby generating a suspension force pointing to a magnetic field enhancement direction. Axial and radial displacement sensors are mounted on the stator, or radial and axial displacement signals of the rotor are detected and identified by means of a displacement-free sensor algorithm, axial and radial displacement closed-loop control is established, and three-degree-of-freedom stable suspension of the rotor is implemented.

A rotation principle is that: the torque windings 9 on the torque teeth 19 are divided into a multi-phase structure; taking a two-phase structure for example, phase A and phase B are sequentially energized, respectively, a closed path is formed between the torque teeth 19 and the rotor teeth 13 in a torque winding magnetic field, a reluctance force is generated, and a torque is generated, thereby implementing the rotation of the rotor.

The invention claimed is:

1. A three-degree-of-freedom bearingless switched reluctance motor excited by a constant current source, comprising a rotor and a stator, the rotor consisting of a rotating shaft and a rotor core, wherein a plurality of rotor teeth is uniformly distributed on an outer circumference of the rotor core; the stator comprises a stator core, a magnetic isolation ring, an axial suspension winding, and a magnetic conduction ring that are sequentially connected outwards in a radial direction of the rotor core, and axial control cores and annular constant current source windings which are symmetrically arranged on both sides of the stator core; outer edges of the axial control cores are connected to the magnetic conduction ring, and inner edges extend to the rotor core and are provided with axial working air gaps; the stator core and the magnetic isolation ring are both of a T-shaped structure consisting of an axial part and a radial part of which an outer end is connected to an inner wall of the axial part; an outer wall of the axial part of the stator core is attached to an inner wall of the axial part of the magnetic isolation ring, and the radial part of the magnetic isolation ring divides the axial part and the radial part of the stator core into two symmetric parts; four suspension teeth are uniformly provided on an inner circumference of the radial part of the stator core; a magnetic isolation body is connected to the inner circumference of the stator core between adjacent suspension teeth; a plurality of torque teeth is uniformly distributed on the magnetic isolation body; radial working air gaps are provided among the suspension teeth, the torque teeth, and the rotor core; and radial suspension windings and torque windings are respectively wound around the suspension teeth and the torque teeth.

2. The three-degree-of-freedom bearingless switched reluctance motor motor excited by a constant current source according to claim 1, wherein the torque winding uses a phase split structure.

3. The three-degree-of-freedom bearingless switched reluctance motor excited by a constant current source according to claim 1, wherein the tooth width of the suspension tooth is greater than that of the torque tooth, and the tooth width of the suspension tooth is greater than one pole pitch of the motor.

* * * * *